Figure 1:
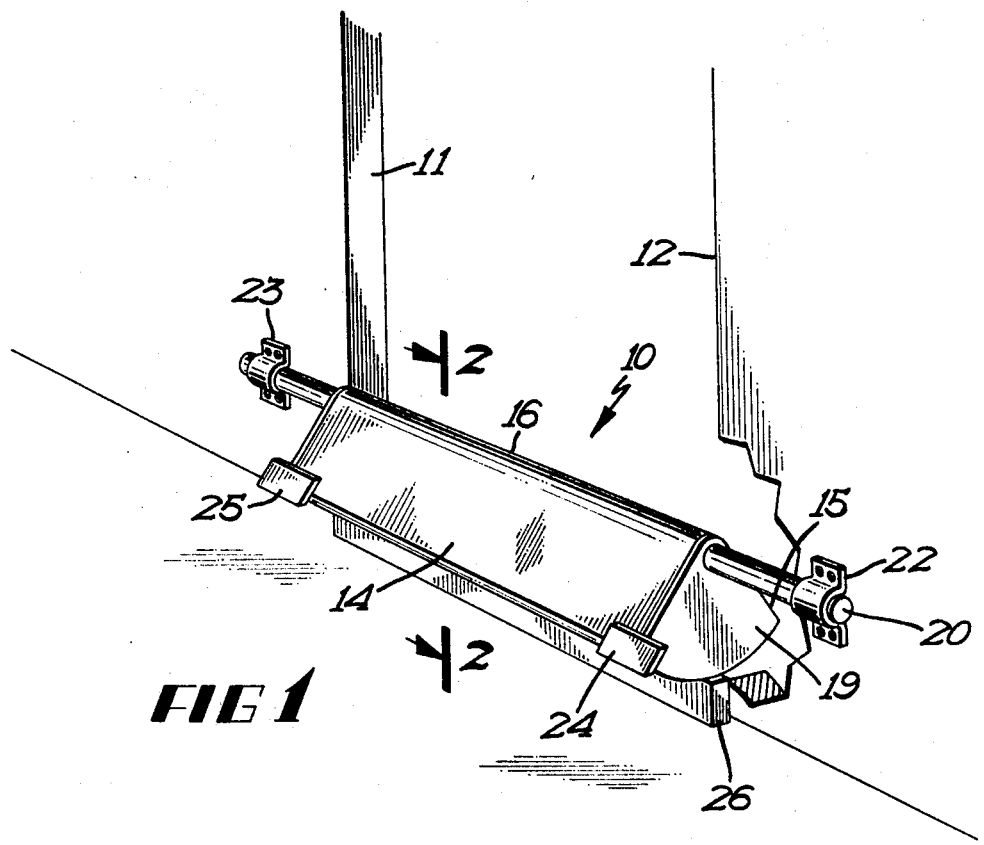

United States Patent

[11] 3,583,367

| | | |
|---|---|---|
| [72] | Inventors | Dale R. Sapp;<br>George T. Donovan, both of Le Center, Minn. |
| [21] | Appl. No. | 790,069 |
| [22] | Filed | Jan. 9, 1969 |
| [45] | Patented | June 8, 1971 |
| [73] | Assignee | Dale R. Sapp<br>Le Center, Minn. |

[54] SWINGING PIG GATE
4 Claims, 2 Drawing Figs.

[52] U.S. Cl. .................................................. 119/155
[51] Int. Cl. .................................................. A01k 29/00
[50] Field of Search .................................. 119/155, 20, 16; 49/388, 142

[56] References Cited
UNITED STATES PATENTS
575,505  1/1897  Donnel et al. ............... 119/155

Primary Examiner—Hugh R. Chamblee
Attorney—Orrin M. Haugen

ABSTRACT: Gate means for animal confining pens comprising a pair of downwardly diverging sidewalls arranged to intersect at an upper apex, closure means disposed along the lower edge surfaces of said downwardly diverging walls and extending generally across the gap formed therebetween, means for coupling the gate means to a hanger for permitting axial rotation of the gate about a generally horizontal axis.

PATENTED JUN 8 1971

3,583,367

INVENTORS
DALE R. SAPP
BY GEORGE T. DONOVAN

Orrin M. Haugen
ATTORNEY

SWINGING PIG GATE

The present invention relates generally to a gate means for an animal confining pen, and more particularly to such a gate which is particularly suited for free-stall farrowing of pigs. In free-stall farrowing of pigs, it is desirable to permit the sow to leave the confined area on occasion, and to return as desired. Also, it is desirable to keep the baby pigs confined within the pen at all times.

Free-stall farrowing is a desirable technique in hog production. It is necessary in pursuing this technique, however, to permit easy egress and ingress for the sow, while keeping the baby pigs confined at all times. In other words, the means must accommodate the sow to the exclusion of the baby pigs.

In the past, various horizontally hinged doors have been utilized, however, when the sow is using the horizontally disposed doors, the baby pigs may freely leave the pen. Furthermore, when horizontally disposed panels have been utilized, through which the sow may come and go, the baby pigs have frequently been able to leave in an uncontrollable fashion.

In accordance with the present invention, a gate means is provided for animal confining pens which includes a pair of downwardly diverging walls which are provided with a closure means along the lower edge surface and further provided with means for receiving a hanger for permitting axial rotation of the gate means about a generally horizontal axis. The downwardly diverging walls are preferably disposed at an angle of from about 60° to 100°, the optimum being 90°. This permits the sow, with its short stride capability, to approach the gate, tilt it outwardly from the pen by merely stepping on the inwardly disposed wall, and thereafter step over the apex area, the short stride then arcuately rotating the gate means in a direction toward or into the pen area. The closure means at the base of the gate prevents the little pigs from leaving the pen area by moving underneath the swinging gate.

Therefore, it is an object of the present invention to provide improved swinging gate means for animal confining pens, particularly adapted for installation in a free-stall farrowing arrangement, the gate means providing ease of egress and ingress for the mature animal, while preventing or restricting egress and ingress of immature animals.

It is a further object of the present invention to provide an improved gate means for free-stall farrowing of pigs in a hog production arrangement, the gate being utilized in the pen area and comprising a pair of downwardly diverging walls intersecting at an upper apex, and being provided with means to permit axial rotation of the gate about a generally horizontal axis to permit mature animals with short stride capability to swing the gate means about a horizontal axis for gaining egress and ingress.

Figure 2:
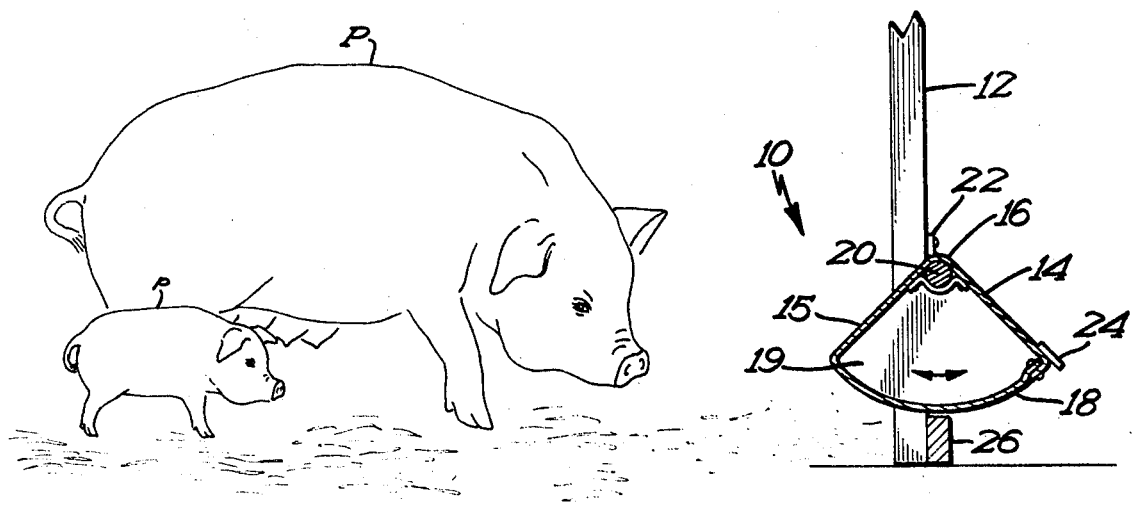

Other and further objects of the present invention will become apparent to those skilled in the art upon a study of the following specification, appended claims and accompanying drawing, wherein:

FIG. 1 is a perspective view of a gate means installed on an animal confining pen, the gate means being arranged in accordance with the preferred embodiment of the present invention, and FIG. 2 is a vertical sectional view taken along the line and in the direction of the arrows 2-2 of FIG. 1, and illustrating a typical installation for the gate means.

With particular reference to the drawing, it will be seen that the gate generally designated 10 is installed in the gap area formed between opposed end walls 11 and 12 of a typical farrowing pen. The gate 10 comprises a pair of downwardly diverging walls 14 and 15, which are arranged to intersect or substantially intersect at an upper apex 16. It will be appreciated, of course, that an intersection is not necessary, the diverging walls being cut short of an intersecting situation, if desired. The diverging walls 14 and 15 define a gap area at the base thereof, this gap area preferably being enclosed by a closure member 18, the closure member 18 preferably being in the form of an arcuate segment. In addition, the gate means is provided with a pair of end walls, these end walls being disposed at each end, such as at 19.

In order to mount the gate means within an animal confining pen, means are provided for coupling the gate to a hanger for permitting axial rotation of the gate means about a generally horizontal axis. In the modification shown in FIGS. 1 and 2, means are provided for receiving a generally horizontally disposed shaft 20, the shaft being adapted for mounting on the walls 11 and 12 by bracket 22 and 23. Also, in order to restrict or limit the extent of axial rotation, stop means or lugs 24 and 25 are arranged on the outer surface, and arranged to contact or abut the walls of the pen. The pen, for purposes of adjusting the height of the gate, is preferably provided with a plate 26 which is arranged in closely spaced relationship to the gate, so as to confine the small pigs appropriately.

In a typical free-stall farrowing operation for hog production, pens are ordinarily or typically about 8 feet long, and 4½ feet wide. The dividers are typically about 36 inches high, with the fronts of the pens being about 42 inches high. The opening for the installation of the swinging gate is ideally about 2 feet wide, thus providing a gate dimension of about 22 inches over all.

Ideally, the diverging walls should be disposed at an angle of about 90°, one to another, although a range of from about 60°—100° should be found useful. The height of the swinging gate is preferably about 8 inches, with the plate 26 preferably being an upright 2×4. As the baby pigs mature, it may be desirable to raise the height of the gate installation, as required.

As an added feature for a free-stall farrowing arrangement utilizing the gate of the present invention, a confining sliding door can be installed above the gate, if desired, however it is appreciated that such a door is not absolutely necessary.

The arcuate motion of the gate permits the mature animals to hobble across the barrier without difficulty. Even during such hobbling, the baby animals, such as baby pigs, are not permitted to leave the confinement of the pen. The arcuate swinging motion of the gate has a further advantage in that it eliminates buildup of straw in the area of the gate, since each time the gate is rocked about its axis, straw is physically moved or pushed away from the gate area.

It will be appreciated that the gate illustrated here is ideally suited for hog production, although it is adaptable to other systems as well. The gate is preferably fabricated from sheet metal, although wood, such as plywood or the like is useful.

What we claim is:

1. Gate means for animal pens comprising:
    a. a pair of axially spaced end walls having a pair of generally radially extending downwardly diverging edges extending from an upper apex, and a generally arcuate edge wall connecting the ends of said radially extending edges;
    b. closure means disposed along the surfaces of said downwardly diverging edge walls and said arcuate edge wall and extending generally across the gap formed in the axial space therebetween;
    c. means adjacent said upper apex for coupling said gate means to a hanger for permitting axial rotation of said gate means about a generally horizontal axis; and
    d. stop means disposed along the base of one of the outwardly disposed downwardly diverging end walls to limit the inward axial rotation of said gate means.

2. The gate means as defined in claim 1 being particularly characterized in that said closure means disposed along the lower edge surfaces is in the form of an arcuate segment so as to form a segment of a right circular cylinder with said downwardly diverging walls.

3. The gate means as defined in claim 1 being particularly characterized in that said downwardly diverging end walls diverge at an angle of from about 60° to about 100°.

4. The gate means as defined in claim 1 being particularly characterized in that said downwardly diverging end walls diverge at an angle of about 90°, one to another.